July 30, 1968

D. J. REED 3,394,825

UNLOADING MECHANISM FOR A STORAGE STRUCTURE

Filed Jan. 26, 1966

INVENTOR
DANIEL J. REED
BY
Merl E. Sceales
ATTORNEY

July 30, 1968 D. J. REED 3,394,825
UNLOADING MECHANISM FOR A STORAGE STRUCTURE
Filed Jan. 26, 1966 2 Sheets-Sheet 2
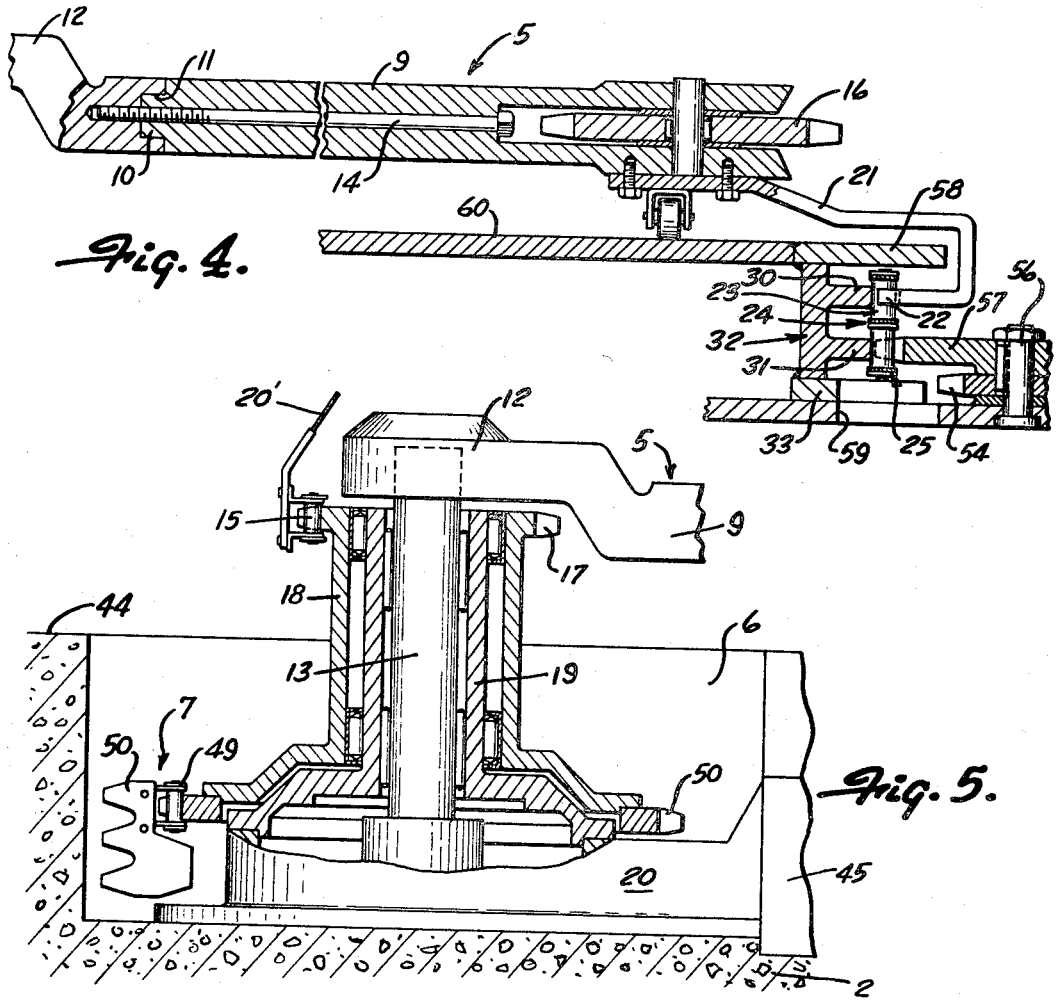
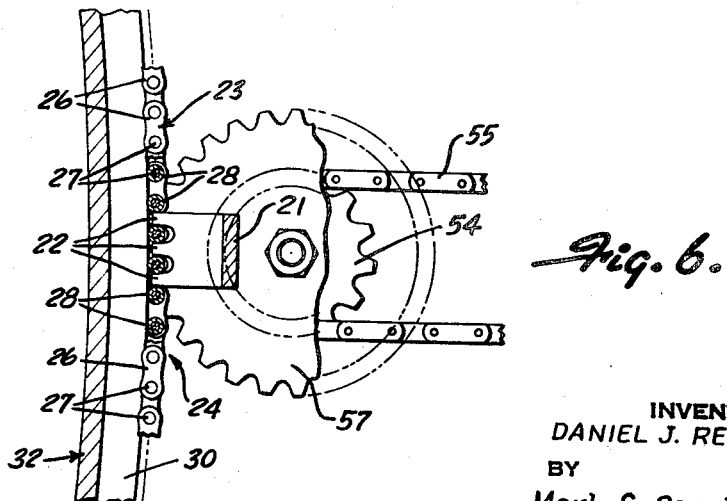
INVENTOR
DANIEL J. REED
BY
Merl E. Sceales
ATTORNEY

United States Patent Office 3,394,825
Patented July 30, 1968

3,394,825
UNLOADING MECHANISM FOR A
STORAGE STRUCTURE
Daniel J. Reed, Ellison Bay, Wis., assignor to A. O. Smith, Harvestore Products, Inc., Arlington Heights, Ill., a corporation of Delaware
Filed Jan. 26, 1966, Ser. No. 523,154
12 Claims. (Cl. 214—17)

ABSTRACT OF THE DISCLOSURE

The invention relates to a silo or other cylindrical storage structure. The lower end of the cylindrical wall of the structure terminates above the foundation and a series of individually removable segments connect the cylindrical wall to the foundation. The stored material is removed from the storage structure by an unloading mechanism including an externally removable cutter arm, journalled for rotation about a hub at the center of the silo floor and utilizing a cutter chain moving in an endless path along the arm. The arm is driven by an endless double chain moving in a recess around the periphery of the silo foundation and the upper part of the chain is connected to the cutter arm by a bracket extending outwardly from the arm, and downwardly to the chain. The lower part of this chain is engaged by a sprocket which is an integral part of the drive unit that drives a conveyor traveling from the center of the silo through a radial trough extending in the foundation to the exterior of the storage structure.

---

This invention relates to a storage structure and more particularly to an unloading mechanism for removing the stored material from a storage structure such as a silo.

Silage and other food products are normally stored in a silo or similar storage structure. To minimize spoilage of the stored material, the silos are frequently sealed so that air will not contact the stored material. With a sealed silo, a bottom unloader is used to remove the silage or other stored material, and the unloader includes an arm which rotates around the floor of the silo and undercuts or dislodges the silage and moves the silage to the center of the silo where it falls into a radially extending trough formed in the floor of the structure. A conveyor operates within the trough to convey the dislodged silage to the exterior of the silo. In the conventional type of bottom unloading mechanism, as shown in the Tiedemann Patent 2,635,770, the cutter arm, as well as the conveyor, are driven by a drive unit which is located on the exterior of the silo. The drive system, to rotate the cutter arm, extends from the drive unit on the outside of the silo within the trough to the center of the silo and is operably connected to the inner end of the cutter arm so that the arm is driven in its rotary path from its inner end.

Recently, the trend has been to larger diameter silos with the result that the length of the cutter arm is correspondingly increased. Increasing the length of the cutter arm substantially increases the moment arm developed at the outer end of the cutter arm as the cutter arm moves into hard packed silage. Thus, the cutter arm cannot merely be increased in length to accommodate larger diameter silos, but must be redesigned structurally to withstand the greater stress encountered in the larger diameter silo. Moreover, there is a certain practical limit to the length of the cutter arm, beyond which the cost of the structural increase far outweighs the increased capacity of the longer cutter arm.

In the conventional bottom unloader, the unloading mechanism is both introduced into the silo and withdrawn from the silo through an access door formed in the wall of the silo. When the unloader is introduced or withdrawn from the silo, the cutter arm is rotated to a position above the conveyor so that the entire unloading unit can be moved through the door. In some situations where the cutter arm has stopped or broken down due to a malfunction and is not located in alignment with the access door, the unloader cannot be removed through the door without manually disassembling the cutter arm within the silo. The disassembly of the cutter arm within the silo is a very dangerous, difficult and time consuming operation.

The present invention is directed to an improved bottom unloading mechanism for a sealed storage structure in which the cutter arm is driven from its outer end and which has a provision for the removal of the cutter arm at all locations, around the circumference of the silo. More specifically, the storage structure includes a foundation which supports a generally cylindrical silo containing the stored material. The bottom edge of the silo wall terminates above the foundation and a series of generally curved, support segments connect the silo wall to the foundation. A circular drive chain is located in a recess at the periphery of the foundation and extends around the entire circumference of the silo. The outer end of the cutter arm, which is journalled for rotation about the center of the silo, is connected by a bracket to the drive chain and as the chain is moved in its endless path, the cutter arm is rotated about the silo. To drive the chain, a sprocket is located on the exterior of the silo and extends through an opening in one of the support segments. The drive sprocket is operably connected to the main drive unit on the exterior of the silo, and as the sprocket is rotated, the chain moves around the periphery of the silo so that the attached cutter arm will be driven in a circular path within the silo. With this construction, the cutter arm, instead of being driven from its inner end, is driven from its outer end. This enables the drive mechanism to be used in larger diameter silos than is possible with a cutter arm which is driven from its inner end.

The use of the removable support segments which connect the silo to the foundation permits access to the cutter arm at all locations around the periphery of the silo. By merely removing one of the segments, both the cutter arm and the cutter chain carried by the arm, are accessible and enables the cutter arm and/or cutter chain to be repaired or removed from the structure regardless of the position of the cutter arm in the silo. This is a distinct advantage over the conventional unloader which requires that the cutter arm be positioned above the conveyor in order to remove the unloading mechanism. With the present structure, however, the cutter arm can be removed from the silo at any position along the periphery of the silo.

Other objects and advantages will appear in the course of the following description.

The drawings illustrate the best mode presently contemplated of carrying out the invention.

In the drawings:

FIG. 4 is an enlarged vertical section showing the cutter arm and the attachment of the cutter arm to the drive chain;

FIG. 5 is a vertical section of the drive mechanism at the central post; and

FIG. 6 is an enlarged horizontal section showing the connection of the cutter arm bracket to the drive chain.

Figure 2:
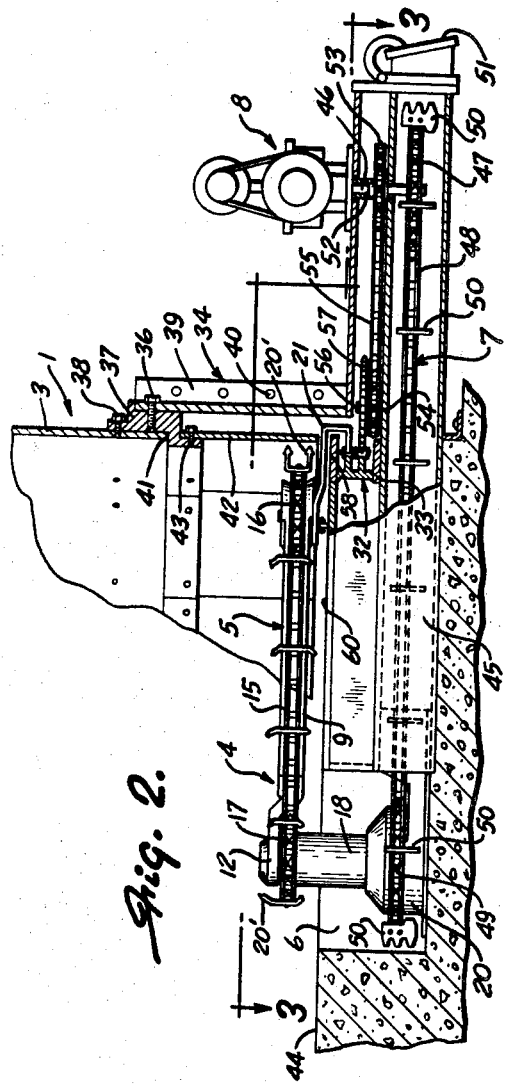
FIG. 2 is an enlarged fragmentary vertical section showing the drive mechanism and the cutter arm.
Figure 3:
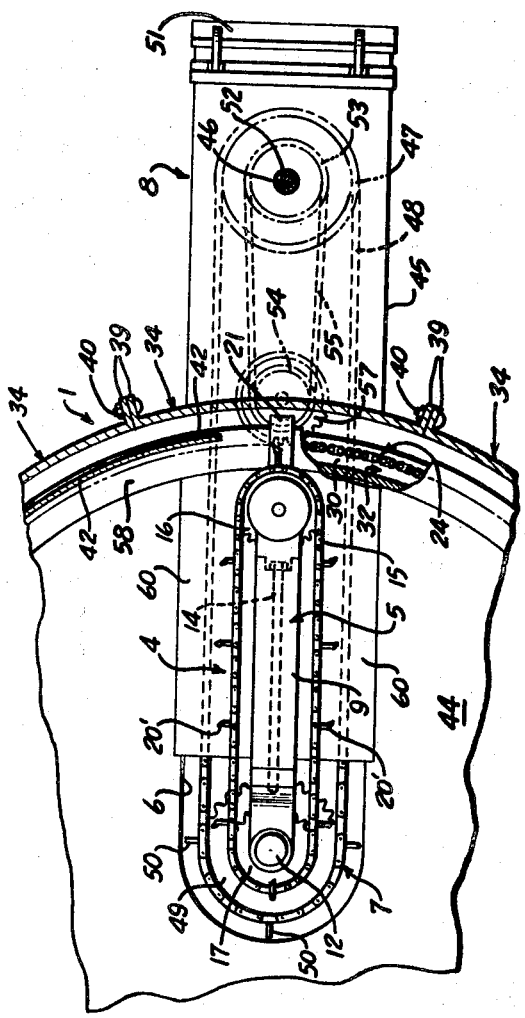
FIG. 3 is a horizontal section taken along line 3—3 of FIG. 1.
Figure 1:
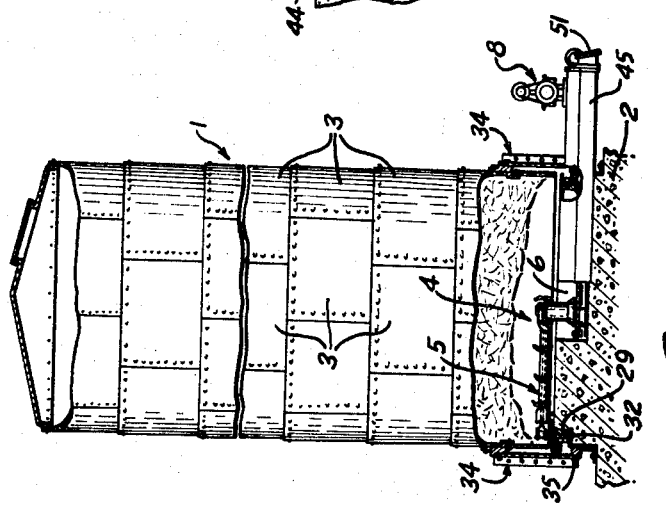
FIG. 1 is a vertical section of a silo, with parts broken away in section, incorporating the unloading mechanism of the invention.

The drawings illustrate a silo 1 or storage structure adapted to contain a stored material such as silage or the like and supported on a foundation 2.

The silo 1 is formed of a series of generally curved panels 3 which are connected together along their adjoining edges by a series of bolts or other connecting members. To minimize spoilage of the stored material, the silo 1 is sealed against the ingress of air, and the stored material is removed from the silo by a bottom unloading mechanism 4.

The unloading mechanism, in general, comprises a cutter arm 5 which is mounted for rotation at the center of the silo and moves in a generally horizontal plane across the floor of the foundation. The cutter arm acts to undercut or dislodge the silage or other stored material and move the dislodged silage to a radially extending trough 6 which is formed in foundation 2. A conveyor 7 operates within the trough 6 and moves the dislodged silage to the exterior of the silo. A drive unit 8, located on the exterior of the silo 1, serves to operate both the cutter arm 5 and the conveyor 7.

The cutter arm 5, as best shown in FIG. 4, includes a generally horizontal beam 9 having an inner end portion 10 of reduced dimension which is received within a socket 11 of hub 12 secured to a central shaft or post 13. The beam 9 of cutter arm 5 is secured to the hub 12 by a machine screw 14 which extends the entire length of the beam and is threaded within an opening in the hub 12 at the base of socket 11. By unthreading the screw 14, the beam 9 of cutter arm 5 can be withdrawn from the hub 12.

The silage or other stored material is dislodged by a cutter chain 15 which moves in an endless path on the cutter arm 5. Chain 15 is supported at its outer end by a sprocket 16 journalled on beam 9 and on its inner end by a drive sprocket 17 which is secured to an outer sleeve 18. Sleeve 18 is mounted for rotation on a stationary inner sleeve 19 supported on base casting 20 located at the central portion of trough 6. The post 13 is journalled for free rotation within the stationary inner sleeve 19.

To dislodge the silage, the cutter chain 15 carries a series of generally diamond shaped teeth 20' which penetrate into the mass of silage and dislodge the same.

As the cuter chain 15 moves in its endless path on the cutter arm 5, the cutter arm rotates about the axis of post 13. To drive the cutter arm 5 in its rotary path, a bracket 21 is secured to the underside of the beam 9 and the outer end of the bracket is bent downwardly with a reverse bend and terminates in a series of fingers 22 which engage the links of an upper chain 23 of a double chain unit 24. The double chain unit 24 includes the upper chain 23 and a lower chain 25, both of which are conventional roller link chains consisting of a series of links 26 pivotally connected to common pins 27 which extend through both of the chains. Spacing sleeves 28 surround pins 27 and serve to space the links 26 of the chains. The chain unit 24 is circular in shape and is located within a recess 29 formed in the upper edge of the foundation 2. The chain unit 24 extends completely around the periphery of the silo 1 and as the chain unit moves within the recess 29, the cutter arm 5 will rotate correspondingly due to the connection of bracket 21 with the upper chain 23.

The chains 23 and 25 are guided in movement within the recess 29 by a pair of annular guides 30 and 31 against which the chains 23 and 25 ride, respectively. Guides 30 and 31 project outwardly from the sidewall of a base ring 32 which is mounted within the recess 29.

The lower end of the base ring 32 terminates in an angle or foot 33 and the lower edges of a series of support segments 34 rest on the foot 33. The lower edge portions of the segments 34 are connected to the base ring 32 by bolts 35.

Segments 34 are generally curved or arcuate in shape, and the series of segments extends completely around the silo and serve to connect the silo 1 to the foundation 2. As best shown in FIG. 2, the upper edges of segments 34 are connected by bolts 36 to a ring 37 which is attached to the lower edge of the panels 3 of silo 1 by bolts 38. The vertical edges of segments 34 are provided with vertical flanges 39 and the adjacent flanges 39 are connected together by bolts 40. The lower portion of ring 37 is provided with a shoulder 41 and the lower edges of panels 3 rest on the shoulder.

To provide a relatively smooth interior wall for the silo 1, a series of curved skirt sections 42 are connected to the lower edge of the upper base ring 37 by bolts 43. The lower edges of skirt sections 42 are spaced slightly above the floor 44 of the foundation 2 and the bracket 21 is adapted to move within the space as the cutter arm 5 rotates within the silo.

As previously mentioned, the segments 34 serve to support the silo 1 above the foundation 2, and the segments extend from one edge of the trough 6 around the silo to the opposite edge of the trough. The opening in alignment with the trough 6 is enclosed by a generally rectangular housing 45 which is secured to the vertical flanges 39 on the adjacent segments 34 and extends outwardly from the silo. The drive unit 8 is supported on the upper surface of the housing 45 and a drive shaft 46, which is driven in the manner described in the Tiedemann Patent 2,635,770, extends downwardly from the drive unit 8 and carries a sprocket 47. The sprocket 47 carries an endless chain 48 of conveyor 7 and the chain is supported at its inner end on a sprocket 49 secured to outer sleeve 18. Chain 48 supports the series of conveyor paddles 50 and as the chain 48 moves in an endless path within the trough 6, the paddles engage and move the dislodged silage through the trough and into the housing 45. As shown in FIG. 2, the outer end of housing 45 is provided with a suitable spring-loaded door 51 through which the silage is discharged to the exterior. While the drawings show the door 51 being located in the end of the housing 45, it is contemplated that the door can also be located in the lower surface of the housing.

Due to the relatively low speed of the cutter arm drive chain 25 compared with the speed of the conveyor chain 7, the cutter arm chain 25 is not driven directly from shaft 46. Instead a sleeve 52 is journaled around the shaft 46 and is driven at a lower speed than shaft 46 by a gear reduction located within the drive unit 8. The lower end of sleeve 52 carries a sprocket 53 which is connected to a sprocket 54 by a chain 55. Sprocket 54 is secured to a vertical shaft 56 journalled between the upper and lower walls of the housing 45, and shaft 56 carries a sprocket 57 which is located between the paths of travel of the endless conveyor chain 48. Sprocket 57 engages the lower chain 25 of double chain unit 24. With this construction, rotation of drive sleeve 52 operates through chain drive 55 to rotate sprocket 57 and thereby move the chain unit 24 within the silo. Movement of chain unit 24 acts to rotate cutter arm 5 about the silo. Both the conveyor chain sprocket 49 and the cutter chain sprocket 17 are secured to outer sleeve 18 so that the cutter chain sprocket 17 will be rotated in accordance with rotation of conveyor sprocket 49. Rotation of sprocket 17 serves to move the cutter chain 15 in an endless path on the cutter arm 5. Thus, the cutter chain 15 is operated in a conventional manner from the conveyor drive, while the cutter arm 5 is rotated about the center of the silo by the chain unit 24 which is operably connected to the outer end of the cutter arm.

As the cutter arm is positively driven from its outer end through the chain drive 24 rather than from its inner end, the drive system can be employed with both large and small diameter silos and is particularly adaptable to large diameter silos where the conventional type of mechanism cannot be successfully employed.

Any silage which may fall through the space between the lower edges of skirt sections 42 and the upper surface 58 of the base ring 32 will collect within the recess 29 and be moved therein by the chain unit 24. One of the sections of the base ring 32 located above the trough 6 is provided with an opening 59 so that the silage will fall through the opening into the trough 6 where it will be conveyed to the housing 45.

The outer portion of the trough 6 is enclosed by a pair of floor plates 60 which are secured flush with the upper surface of the foundation and extend over the trough 6. The central portion of the trough, however, located at the center of the silo is open so that the silage being dislodged by the cutter arm 5 will fall into the central portion of the trough and will be conveyed to the exterior by the conveyor 7.

Normally, the unloading mechanism is removed from the silo by rotating the cutter arm 5 until it is in vertical alignment above the conveyor unit 7. By disconnecting the housing 45 from the silo wall, the entire unloading unit can be withdrawn from the silo after disconnecting the double chain 24 and 25. However, if a breakdown or malfunction should occur, causing the cutter arm to stop at a location out of alignment with the conveyor unit 7 and trough 6, the present invention permits the cutter arm and the conveyor to be readily removed from the silo. For example, if a breakdown occurs, the position of the cutter arm can be determined from a position indicator at the drive unit. After determining the location of the arm, the appropriate segment 34 is removed and the corresponding skirt section 42 is also removed which will expose the outer end of the cutter arm 5. If the breakdown has occurred due to a malfunction of the cutter chain 15, the chain can be broken and removed through the opening to the exterior. If the cause of the breakdown was in the drive chain unit 24, the chain can be broken and removed through the opening. After repairing, the chain unit 24 can be threaded around the structure utilizing the drive sprocket 57. The chain ends can then be rejoined and the drive sprocket 57 reengaged with the chain. However, if the cutter arm 5 is the cause of the breakdown, the cutter chain 15 is initially broken and removed. Removal of the long machine screw 14 then allows the entire beam 9 of cutter arm 5 to be removed through the opening in the silo wall. The remaining sections of the unloader can then be removed in the conventional manner through the trough 6 by disattachment of the housing 38. After the necessary repairs, the cutter arm 5 and its chain 15 can be reassembled with the unloader and the entire unloader reintroduced into the structure in the normal manner through trough 6. The segments 42 and 34 are then replaced, chains 24 and 25 reconnected and the unloader is ready for operation. Thus, the unloading mechanism of the invention has a provision for removal of the cutter arm from the silo regardless of the position of the cutter arm with respect to the trough 6. This substantially simplifies the removal of the cutter arm in case of a malfunction or breakdown. Moreover, the use of the segments 34 enables drive chain unit 24 to be readily removed or repaired without disturbing the unloading mechanism. As each of the segments 34 has a relatively short arcuate length, the removal of one of the segments will not seriously weaken the structure so that access can be had to the chain unit 24, as well as the cutter arm 5, at any point around the circumference of the silo.

Various modes of carrying out the invention are contemplated as being within the scope of the following claims particularly pointing out and distinctly claiming the subject matter which is regarded as the invention.

I claim:

1. In combination with a storage structure mounted on a foundation, dislodging means mounted for rotation at substantially the center of the storage structure and extending radially to a location adjacent the wall of the structure, said dislodging means disposed to move over the upper surface of the foundation to dislodge the stored material, conveying means for conveying the dislodged silage to the exterior of the structure, an endless member disposed within the storage structure and extending around the periphery thereof concentrically of said structure and disposed within the periphery of the structure at a level beneath the upper surface of the foundation and beneath said dislodging means, connecting means for connecting the outer end of the dislodging means to the endless member whereby the dislodging means rotates in accordance with the movement of said endless member, and drive means for driving the endless member and including a drive member extending through an opening in the wall of the structure and engaged with said endless member.

2. The structure of claim 1, in which the upper surface of the foundation is provided with a radially extending trough, said structure also including a housing located on the exterior of the structure and disposed in communication with the outer end of said trough and having a material discharge opening therein, said conveying means located within said trough and said housing, said drive means being located on the exterior of the structure and said drive member disposed within the housing and engaged with the endless member, said structure also including an annular reinforcing member extending around the lower end of the structure, and a series of generally curved, individually removable, interconnected segments, said segments connecting said reinforcing member to the foundation, said support segments extending around the structure from one side of said housing to the other side of said housing and supporting the storage structure.

3. The construction of claim 2 and including a series of skirt sections located radially inward of said segments and being substantially flush with the interior surface of the wall of the storage structure, the lower edges of said skirt sections being spaced upwardly from the upper surface of said foundation to provide a clearance therebetween and said connetcing means being disposed within said clearance.

4. The structure of claim 1, in which the endless member comprises a chain unit including an upper chain and a lower chain disposed in different horizontal planes and connected together as an integral unit, said connecting means being connected to the upper chain and said drive means being operably connected to said lower chain.

5. The structure of claim 1, in which the foundation has an annular recess located at the upper peripheral edge thereof and said endless member is a chain mounted for travel in said recess, said connecting means comprising a bracket extending generally horizontally from said dislodging means and then downwardly into said recess and being connected to said chain.

6. The structure of claim 1, in which the foundation has an annular recess located at the upper peripheral edge thereof and said endless member is a chain mounted for travel in said recess, said structure also including a floor member attached to the upper surface of the foundation and covering the upper end of said recess with the outer end of said recess being open, said connecting means comprising a bracket extending radially outward from said dislodging means beyond said floor member, then downwardly to a level beneath said floor member and then radially inward and being connected to said chain.

7. The construction of claim 6, in which the radially inward extending portion of said bracket is provided with a series of fingers disposed to engage a plurality of links of said chain.

8. The structure of claim 1, in which the foundation has an annular recess located at the upper peripheral edge thereof and said endless member is a chain unit mounted for travel in said recess, a base ring disposed within said recess and having a pair of annular guide members, said chain unit including an upper annular chain and a lower annular chain, said chains being disposed in different horizontal planes and being connected together as an integral unit, each of said chains adapted to ride against one of said guide members on said base ring to guide said chain in movement within said recess.

9. A storage structure, comprising a foundation having an upper supporting surface, a vessel mounted above the foundation, an annular member disposed around the lower edge of said storage structure, a series of generally arcuate interconnecting segments connected to the annular member and extending completely around the periphery of the vessel and supporting said storage structure on the foundation, a trough formed in the supporting surface of the foundation and extending from the center of the vessel to the exterior, and an unloading mechanism disposed within the vessel for unloading material therefrom, said unloading mechanism including a material dislodging member mounted for rotation at the center of the vessel and disposed to rotate over said supporting surface and extending radially outward from said center to a position adjacent the wall of the vessel, said member acting to dislodge the stored material and convey the same to the center of the silo, and said unloading mechanism including conveying means located within the trough for conveying the dislodged silage from the center of the silo to the exterior, said supporting segments being individually removable at locations around the periphery of the vessel to permit access to the outer end of said member at positions around the periphery of the vessel.

10. In a storage vessel having a material dislodging member mounted for rotation at the center of the vessel and extending radially outward from said center to a position adjacent the wall of the vessel, said member acting to dislodge the stored material and convey the same to the center of the silo, said material dislodging member including a hub journaled at the center of the vessel and an arm extending outwardly from the hub, said dislodging member also including a removable connecting member having a portion located at the outer end of the arm and extending along said arm and removably engaged with the hub to thereby enable the arm to be disconnected from the hub and withdrawn from the vessel through an opennig in the wall of the vessel.

11. The structure of claim 10, in which the connecting means comprises a screw having its head located at the outer end of the arm and the inner end of the screw being threaded within an opening in the hub.

12. The structure of claim 9 and including an endless member extending around the periphery of the foundation at a level beneath the upper surface of the foundation and disposed within the confines of said vessel, means for connecting the outer end of said dislodging member to the endless member whereby the dislodging member will rotate within the vessel in accordance with movement of the endless member, and drive means for driving the endless member in a path around the periphery of the vessel and including a drive member extending through an opening in one of the segments and engaged with said endless member.

References Cited

UNITED STATES PATENTS 2,635,770    4/1953    Tiedemann   ---------- 214—17
2,969,156    1/1961    Miller et al.   --------- 214—17

OTHER REFERENCES

German printed application, No. 1,143,148, January 1963.

ROBERT G. SHERIDAN, *Primary Examiner.*